(12) United States Patent
Aghajanian

(10) Patent No.: US 8,061,571 B2
(45) Date of Patent: Nov. 22, 2011

(54) COLLAPSIBLE TRAILER CONTAINER

(76) Inventor: Martin Aghajanian, Sherman Oaks, CA (US)

( * ) Notice: Subject to any disclaimer, the term of this patent is extended or adjusted under 35 U.S.C. 154(b) by 1035 days.

(21) Appl. No.: 11/729,520

(22) Filed: Mar. 28, 2007

(65) Prior Publication Data
US 2008/0238141 A1 Oct. 2, 2008

(51) Int. Cl.
B60R 9/06 (2006.01)

(52) U.S. Cl. .......................... 224/499; 224/519; 224/527

(58) Field of Classification Search .................. 224/498, 224/42.34, 497, 499, 519, 524, 526, 527; 220/692, 693, 666, 4.28, 4.33
See application file for complete search history.

(56) References Cited

U.S. PATENT DOCUMENTS

| 2,258,364 | A | * | 10/1941 | Maxwell | 190/11 |
|---|---|---|---|---|---|
| 4,674,647 | A | * | 6/1987 | Gyenge et al. | 220/6 |
| 5,354,090 | A |  | 10/1994 | Grovom |  |
| 5,439,151 | A |  | 8/1995 | Clayton |  |
| 5,699,985 | A |  | 12/1997 | Vogel |  |
| 5,755,480 | A | * | 5/1998 | Bryan | 296/26.01 |
| 5,881,937 | A |  | 3/1999 | Sadler |  |
| 6,056,177 | A | * | 5/2000 | Schneider | 224/401 |
| 6,135,332 | A | * | 10/2000 | Eleam | 224/275 |
| 6,145,720 | A |  | 11/2000 | Comeau |  |
| 6,237,823 | B1 |  | 5/2001 | Stewart et al. |  |
| 6,382,486 | B1 | * | 5/2002 | Kretchman et al. | 224/498 |
| 6,419,103 | B1 | * | 7/2002 | Wang | 220/4.33 |
| 6,712,248 | B2 | * | 3/2004 | Mitchell | 224/499 |
| 6,802,441 | B1 |  | 10/2004 | DuRant et al. |  |
| 6,848,732 | B2 | * | 2/2005 | Green | 296/24.33 |
| 7,156,273 | B2 | * | 1/2007 | Morris | 224/487 |
| 2004/0173610 | A1 | * | 9/2004 | Gregorio Gracia | 220/4.28 |
| 2005/0242141 | A1 | * | 11/2005 | Zhang | 224/499 |
| 2006/0006175 | A1 | * | 1/2006 | Carola | 220/6 |
| 2006/0220346 | A1 |  | 10/2006 | Fulton et al. |  |

* cited by examiner

Primary Examiner — Justin Larson

(57) ABSTRACT

A collapsible trailer container for automobiles, comprising a rectangular enclosure having a base member and four vertical panels pivotally connected to the base member such that the panels can be pivotally moved to made them rest in a stacked configuration above the base member. The container also comprises two tubes, each connected to each side edge of each of the four vertical panels, and a pin inserted through the tubes when aligned, for locking the panels in a vertical position to form the enclosure with open top.

21 Claims, 10 Drawing Sheets

COLLAPSIBLE TRAILER CONTAINER

CROSS-REFERENCE TO RELATED APPLICATION

None

FEDERALLY SPONSORED RESEARCH

Not Applicable

SEQUENCE LISTING OR PROGRAM

Not Applicable

STATEMENT REGARDING COPYRIGHTED MATERIAL

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND

The present invention relates in general to automobile trailers, and more particularly to a collapsible trailer container for automobiles.

Several trailers and carriers for automobiles have been developed in the art. For example U.S. Pat. No. 5,354,090 to Grovom discloses a trailer having a fixed framework and a telescoping framework engaging the fixed framework for shortening or lengthening of the trailer, a flexible floor foldable for use in either mode, a hitch assembly which permits ninety degree upwardly pivot of the trailer when in the shortened mode for non-ground support portability on the towing vehicle, and a support bar engaging the towing vehicle for holding the trailer in the supported, portable position. A substantially V-shaped housing on the trailer provides a storage container with low center of gravity and also provides axle housing for the trailer wheels.

U.S. Pat. No. 5,881,937 to Sadler discloses a vehicle cargo carrier, and specifically a movable frame assembly, for storing and transporting luggage, gear, equipment and the like on the exterior of a vehicle. The carrier is attached to a common trailer hitch and is particularly well suited for use with a mini-van or sport utility vehicle which has a rear opening door or hatch. The carrier is movable, permitting outward extension, while still being connected to the vehicle, to provide easy access to and unobstructed opening of the vehicle rear door or hatch, and to provide unobstructed access to the vehicle's existing interior cargo area. The frame assembly comprises a connection member interfacing with the hitch and a frame member which interfaces with the connection member. A storage box or container member is connected to the frame member. However, the above two inventions are used for supporting a container or storage box unlike the collapsible trailer container of the present invention.

U.S. Pub. No. 20060220346 to Fulton discloses a trailer which can be attached to the rear of a personal mobility vehicle. When not in use, the trailer folds and stores in a carrier attached to the lower framework of the personal mobility vehicle. When needed, the trailer is lifted out of the carrier, the collapsible container is unfolded and the trailer is ready for use. The trailer is attached to the personal mobility vehicle at all times whether in use or not in use by a coupler. The tongue of the trailer is supported by the chassis of the trailer and is adjustable so as to retract or extend as needed. The chassis is attached to the container and also supports the tires and wheels. Although this invention comprises a collapsible container, the structure of the container and the folding means employed in the present invention are different.

Typical trailer containers or boxes are inconvenient to carry and store when not in use due to their size. It is therefore an object of the present invention to provide a collapsible trailer container for automobiles that can be folded down to a flat configuration when not in use.

A further object is to provide a collapsible trailer container for automobiles that is easy to install. These and other objects of the present invention will become better understood with reference to the appended Summary, Description, and Claims.

SUMMARY

The present invention is a collapsible trailer container for automobiles. The container comprises a rectangular base member and four panels. The panels are pivotally connected to the base member at varying heights such that they can be folded down and stacked above the base member. The panels are locked in a vertical position using locking means to form an open top rectangular enclosure. The base member has upright members at its corners to which the panels are pivotally connected. The container also comprises an I-section for supporting the base member and an elongate bar extending from the I-section. The elongate bar is connected to the automobile using typical connecting means such as a pin joint.

FIGURES

Reference Numerals

Figure 1:
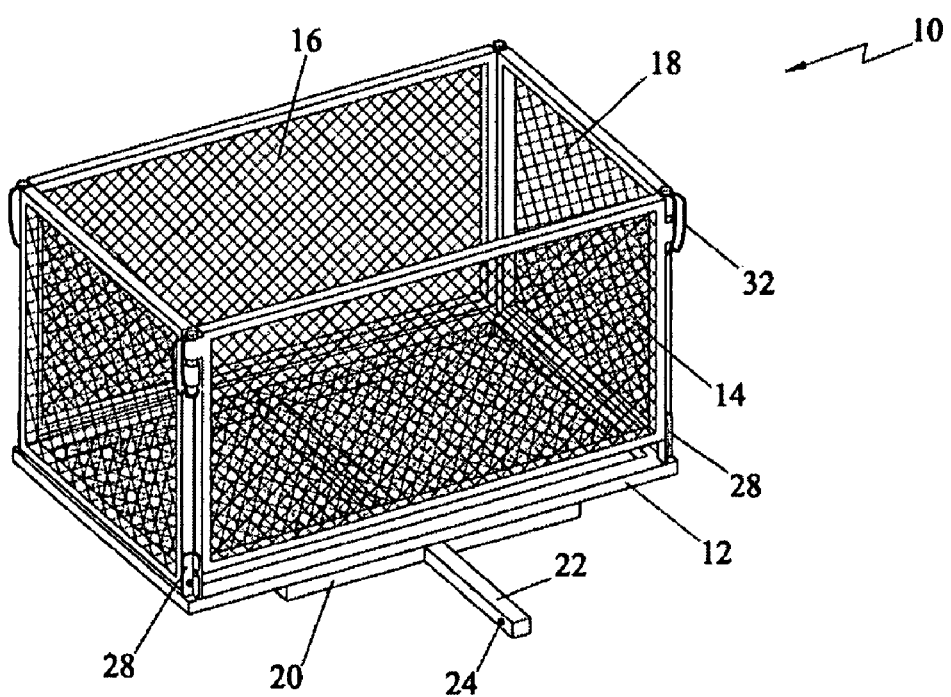
FIG. 1 is a front perspective view of a collapsible trailer container with the panels in vertical position in accordance with the present invention.

10 . . . Collapsible Trailer Container
12 . . . Base Member
14 . . . Front Panel
16 . . . Rear Panel
18 . . . Side Panel
20 . . . I-Section
22 . . . Elongate Bar
24 . . . Hole
26 . . . Automobile
28 . . . Upright Protruding Member
30 . . . Tube
32 . . . Pin
34 . . . Lid
36 . . . Slot
38 . . . L-shaped Bracket
40 . . . Hook

DETAILED DESCRIPTION

Referring to the drawings, a preferred embodiment of a collapsible trailer container for automobiles is illustrated and generally indicated as 10 in FIGS. 1 through 6. The trailer container 10 is hitched to automobiles using typical connecting means, such as a hole-pin connection.

Figure 2:
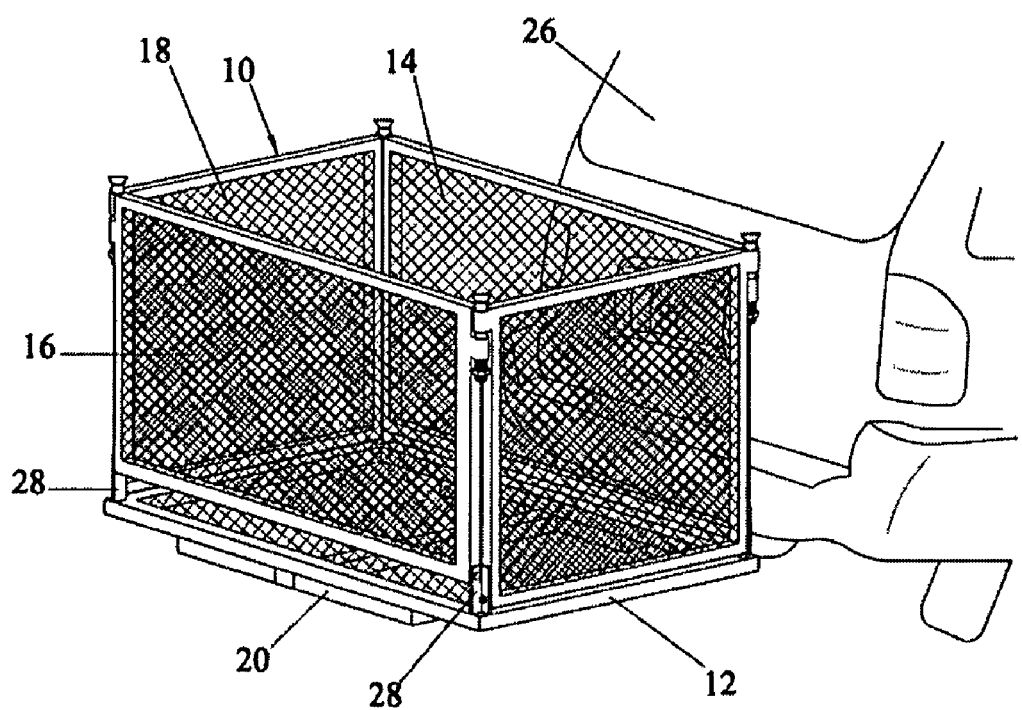
FIGS. 2 through 5 depict the sequential operations involved in folding the container when hitched to an automobile in accordance with the present invention.

Referring to FIGS. 1 and 2, the collapsible container 10 comprises a rectangular base member 12 and four mesh panels, namely, front 14, rear 16 and a pair of side panels 18. The container further comprises an I-section 20 below the base member 12, and an elongate bar 22 extending from the I-section 20. More particularly, the elongated member 22 extends from the bottom of the base member 12 centrally. The free end of the elongate bar 22 includes a hole 24 for connecting the container 10 to an automobile 26 using a pin joint such that base member 12 is parallel to the ground as shown in FIG. 2. In a preferred embodiment, the base member and the panels comprise a meshed metal structure bordered by a metal frame.

Figure 3:
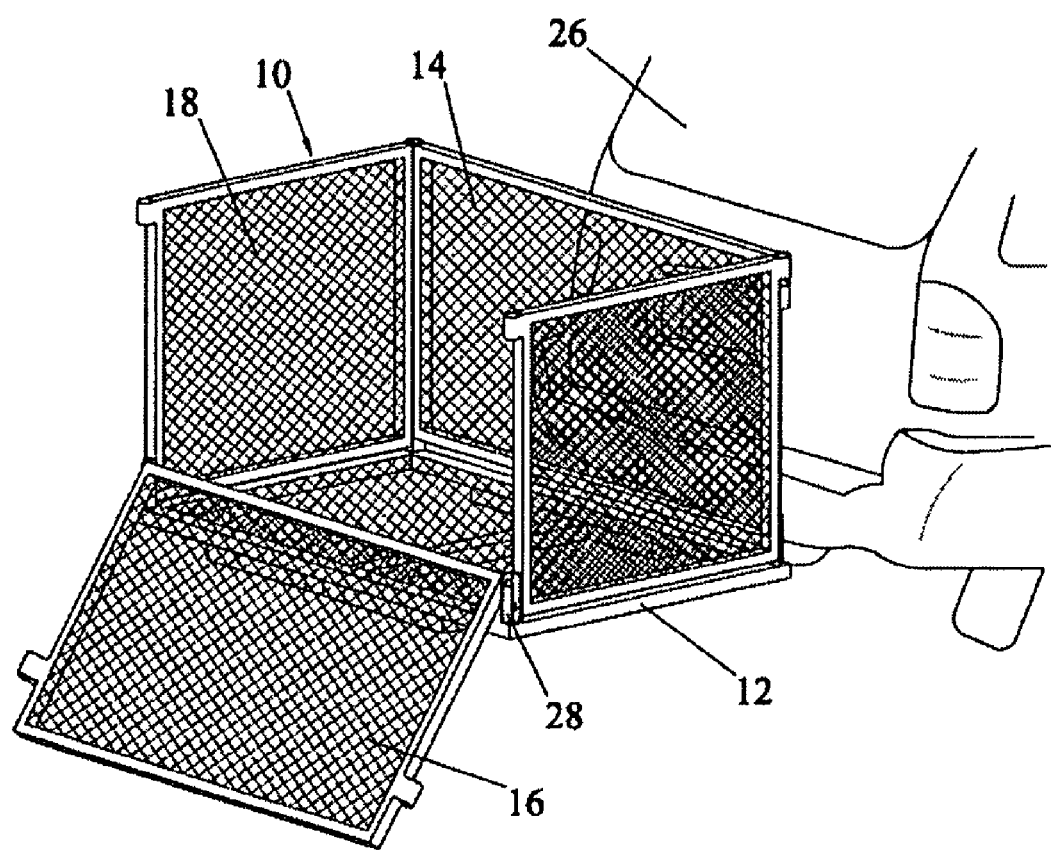
Figure 4:
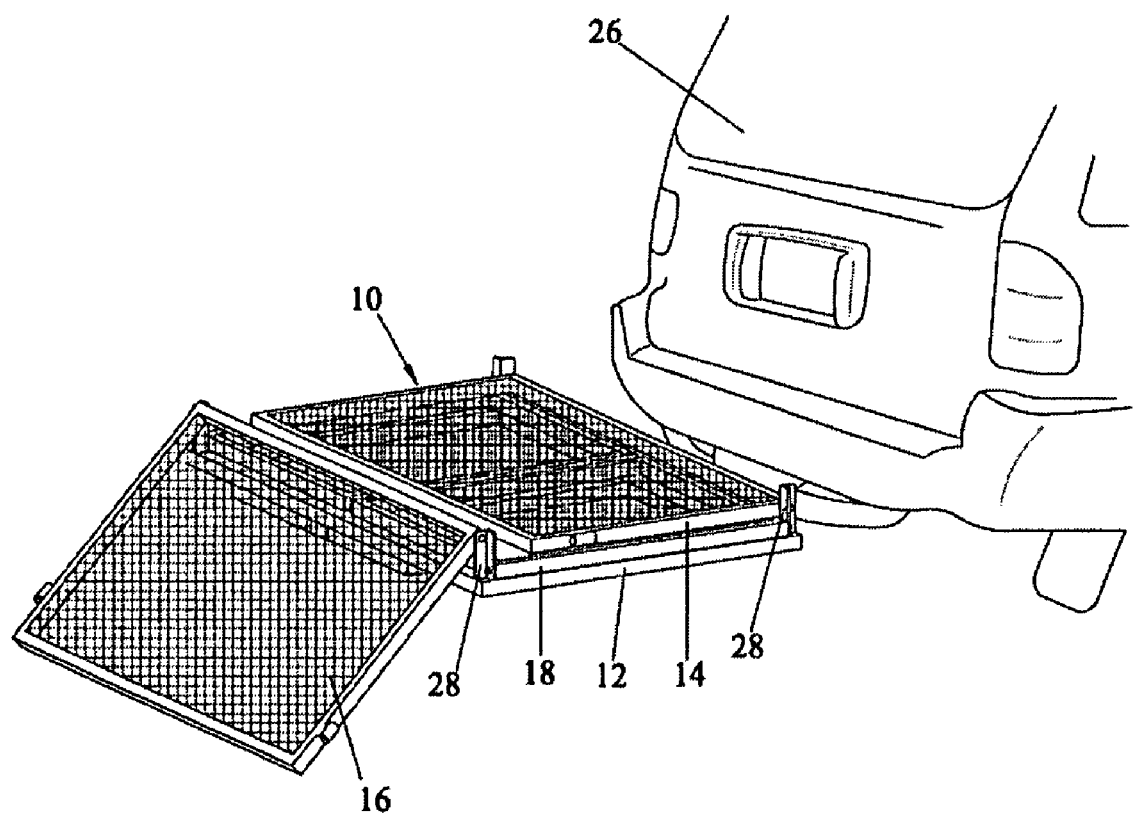
Figure 5:
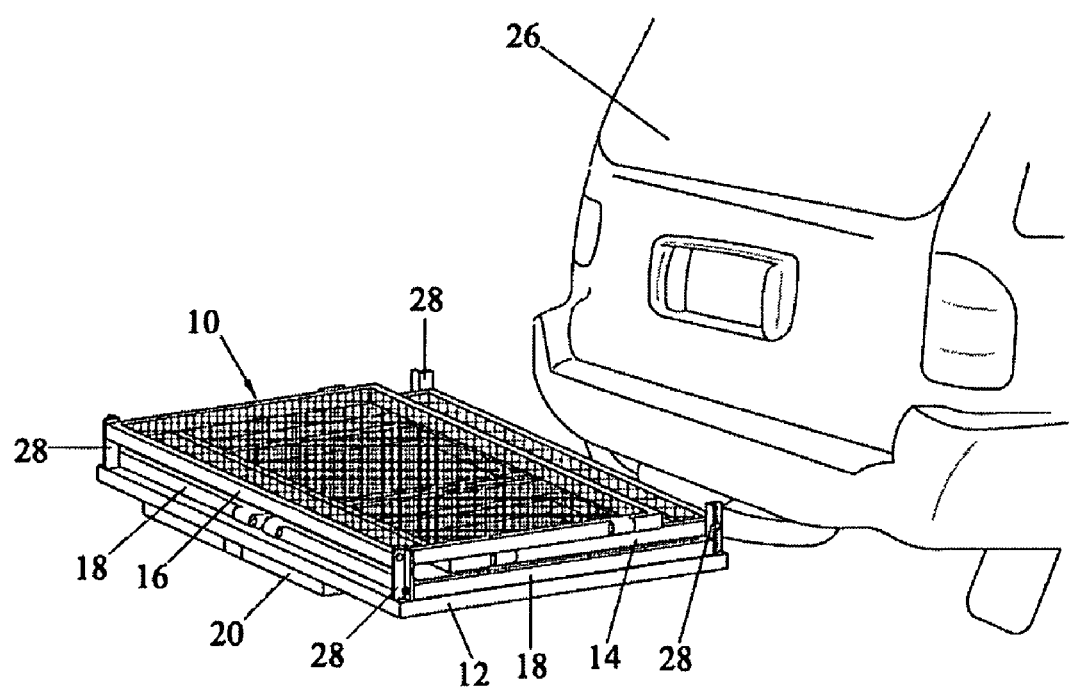

Referring to FIGS. 2 through 4, the base member 12 comprises four upright protruding members 28, each extending from each of its corners. Each upright protruding member 28 is comprised of two identical strips, each connected together about their longitudinal edges at right angles. The bottom corners of each side panel 18 are pivotally connected between a pair of upright protruding members 28 at the bottommost location. More particularly, the bottom corners are connected between two parallel strips of the pair of upright protruding members 28. The bottom corners of the rear panel 16 are pivotally connected to a pair of upright protruding members 28, above the level of the pivotal connections of the side panels 18. Finally, the bottom corners of the front panel 14 are pivotally connected to a pair of upright protruding members 28, above the level of the pivotal connection of the rear panel 16. The pivotal connection between the panels and the upright protruding members 28 is established by push on nuts and shafts/tubes/metal rods.

Referring to FIGS. 2 through 5, with the above arrangement, the panels can be folded down to rest above the base member 12 in a stacked configuration. In the stacked configuration, the side panels 18 rest on the base member 12; the rear panel 16 rests on the folded side panels 18; and the front panel 14 rests on the folded rear panel 16.

Figure 6:
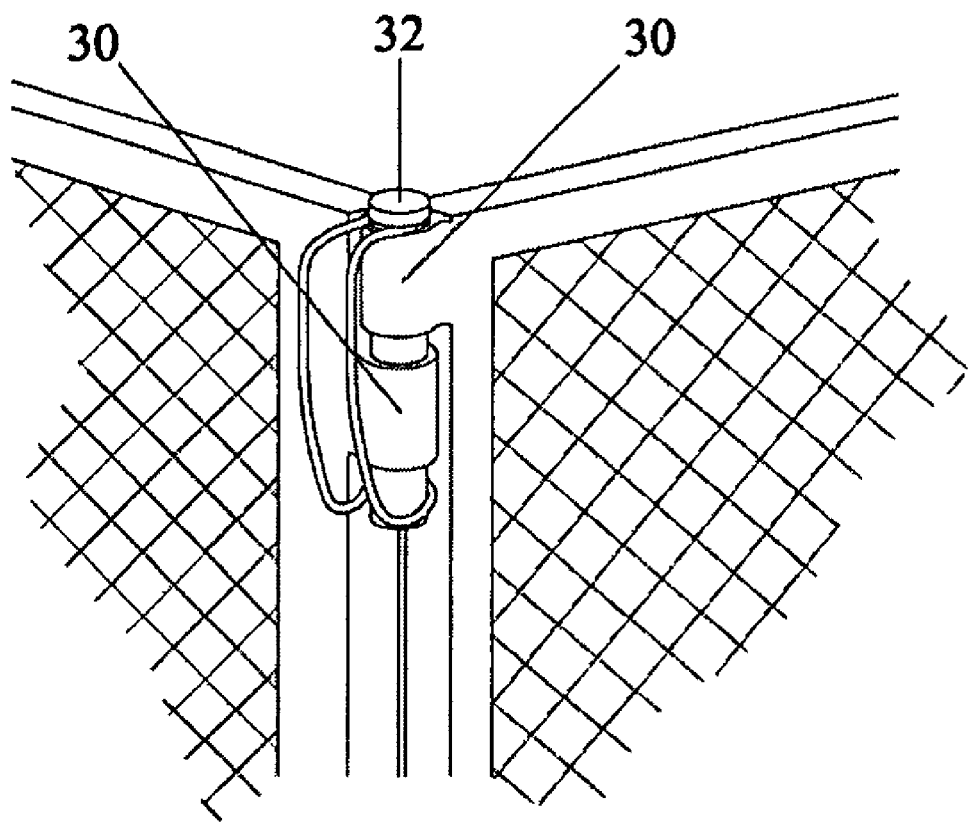
FIGS. 6 through 8 depict various embodiments of the locking means in accordance with the present invention.
Figure 7:
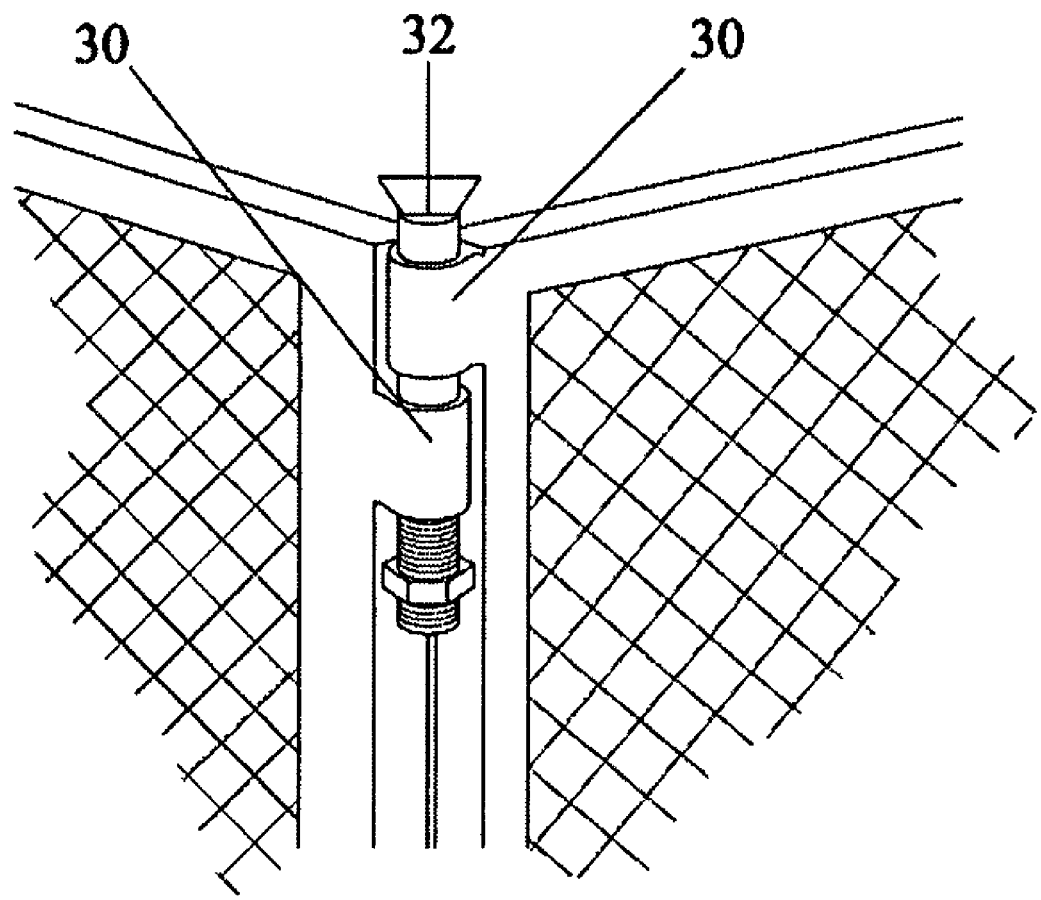
Figure 8:
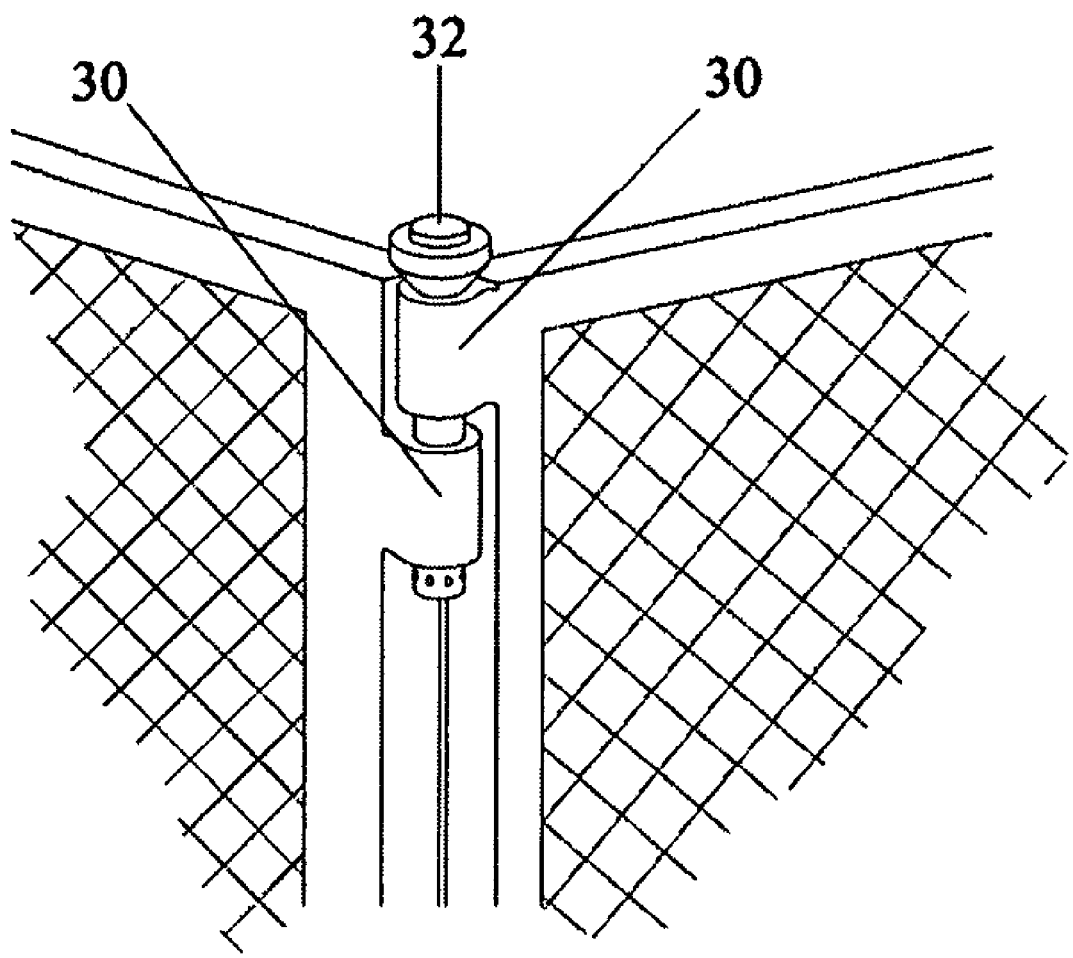

Referring to FIGS. 6 through 8, each side edge of each panel is connected with the tube 30, such that a rectangular enclosure is formed when the panels are in the vertical position. The tubes 30 of any two adjacent panels align with each other. Once aligned, a pin 32 is inserted through the aligned tubes 30 so as to lock the panels in the vertical position. The pin 32 can either be threaded or non-threaded. If the pin 32 is non-threaded, there is a means to secure it to the tubes 30. The securing means may comprise a looped wire or strap that is attached to the head of the pin such that when the pin is inserted through the aligned tubes 30, the wire or strap is looped about the bottom portion of the pin so as to prevent the pin from coming out of the aligned tubes 30. Alternatively, the bottom of the pin may contain a plurality of retractable upward projections for preventing the pin from coming out of the aligned tubes. The panels are dimensioned such that their top edges lie in the same horizontal plane when locked in the vertical position.

Figure 9:
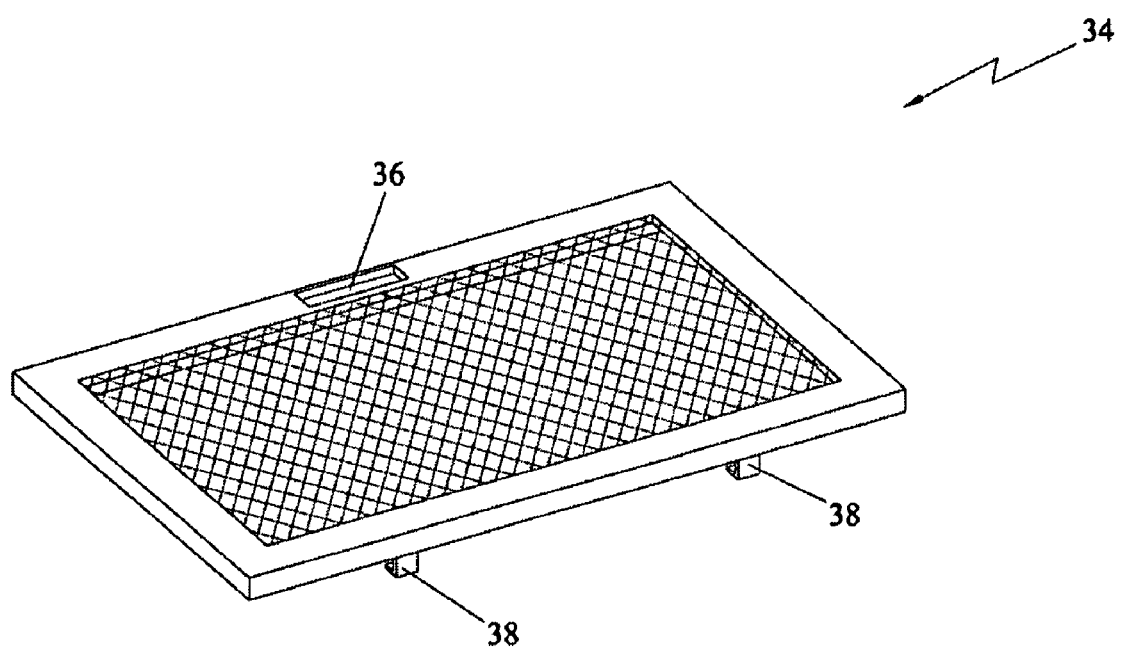
FIG. 9 is a perspective view of the lid for the trailer container in accordance with the present invention.
Figure 10:
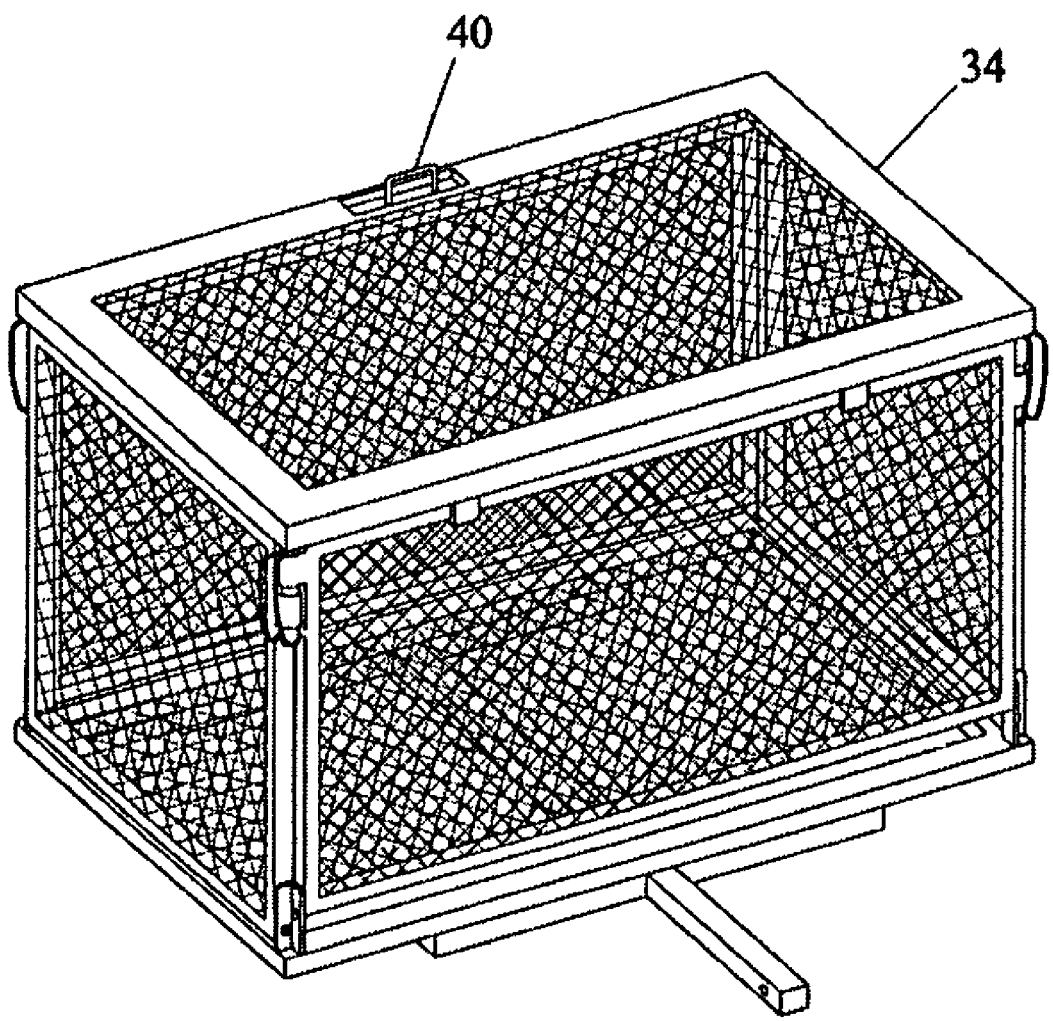
FIG. 10 is a perspective view the trailer container with the lid in accordance with the present invention.

Referring to FIGS. 1, 9 and 10, in an additional embodiment the trailer container further comprises a lid 34. The lid 34, like the base member, is a rectangular panel and comprises a slot 36 on its rear side and a pair of L-shaped brackets 38 on its front side. A hook 40 is provided on the top side of the rear panel 16. The bottom horizontal portion of the brackets 38 are received below the top side of the front panel 14 and the hook 40 is received in the slot 30 for installing the lid. The lid 34 can then be secured using a lock to the hook 40.

All features disclosed in this specification, including any accompanying claims, abstract, and drawings, may be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C. §112, paragraph 6. In particular, the use of "step of" in the claims herein is not intended to invoke the provisions of 35 U.S.C. §112, paragraph 6.

Although preferred embodiments of the present invention have been shown and described, various modifications and substitutions may be made thereto without departing from the spirit and scope of the invention. Accordingly, it is to be understood that the present invention has been described by way of illustration and not limitation.

What is claimed is:

1. A collapsible trailer container for automobiles, comprising:
   (a) a one-piece base member;
   (b) four upright supporting members connected perpendicularly to the base member; each upright supporting member containing two perpendicular walls with at least one hole on each wall to receive a pivoting axle;
   (c) four one-piece panels pivotally connected to the four upright supporting members such that the panels can be pivotally moved into a vertical or horizontal position above the base member;
   (d) locking means for locking the panels in a vertical position to form an enclosure;
   (d) a first bar parallel to the base member and supporting the base member and a second bar extending perpendicularly from the first bar; the bar for hitching the container to automobiles such that the base member is parallel to the ground; and
   (e) a hinged lid.

2. The collapsible container of claim 1, wherein the container further comprises an I-section supporting the base member and an elongate bar extending perpendicularly from the I-section; the elongate bar for hitching the container to the automobile such that the base member is horizontal to the ground.

3. The collapsible container of claim 1, wherein the container is made of metal.

4. The collapsible container of claim 1, wherein the base member and the panels comprise a meshed metal structure bordered by a metal frame.

5. The collapsible container of claim 1, further comprises a lid adapted to be secured on top of the panels after the panels are locked in the vertical position.

6. The collapsible container of claim 5, wherein the lid comprises at least one slot for receiving at least one hook on at least one panel and at least one bracket to grip at least one other panel; the lid is secured using a lock to the hook.

7. The collapsible container of claim 1, wherein the base member has four sides, the base member is connected to four upright supporting members comprising two identical strips attached to each other about their longitudinal edges at right angles and the panels are pivotally using rotating axles between the upright supporting members.

8. The collapsible container of claim 7, wherein the panels comprise two side panels, a front panel, and a rear panel.

9. The collapsible container of claim 7, wherein the panels are dimensioned such that their top edges lie in the same horizontal plane when they are locked in the vertical position.

10. The collapsible container of claim 1, wherein the container is an open top rectangular enclosure, with the base member that is rectangular and four of the panels, each pivotally connected to each side of the base member at varying heights.

11. The collapsible container of claim 10, wherein the panels are dimensioned such that their top edges lie in the same horizontal plane when they are locked in vertical position.

12. The collapsible container of claim 10, wherein the base member comprises an upright supporting member extending from each of its corners and the bottom corners of each of the panels are pivotally connected between a pair of the upright supporting members.

13. The collapsible container of claim 12, wherein the panels comprise a front panel, a rear panel, and a pair of side panels; the height of each side panel being half the length of the base member.

14. The collapsible container of claim 13, wherein the side panels, the rear panel, and the front panel are connected between the upright supporting members at a first, second and third locations, respectively, wherein the first, second, and third locations are at varying heights from the bottom of the upright supporting members.

15. The collapsible container of claim 14, wherein the first, second, and third locations are in the increasing order of their heights from the bottom of the upright supporting members so that when the container is to be collapsed, the side panels are to be folded and rested on the base member first, followed by the rear panel, and finally the front panel.

16. The collapsible container of claim 1, wherein the locking means comprises:
   (a) two tubes, at least a quarter inch in length, each connected to each side edge of each of the four panels such that, when two adjacent panels of the four panels are pivotally moved to a vertical position, the tubes align; and
   (b) a pin for inserting through the aligned tubes thereby locking the panels in vertical position.

17. The collapsible container of claim 16, wherein the tubes are internally threaded for receiving the pin, which is externally threaded.

18. The collapsible container of claim 16, wherein the pin is slidably received within the aligned tubes.

19. The collapsible container of claim 18, wherein the pin comprises a means for irremovably securing itself in place within the aligned tubes.

20. The collapsible container of claim 19, wherein the means for irremovably securing the pin in place within the aligned tubes comprises a plurality of retractable upward projections located at the bottom of the pin for preventing the pin from coming out of the aligned tubes.

21. The collapsible container of claim 19, wherein the means for securing comprises a looped wire attached to the head of the pin; the wire to be looped around the bottom portion of the pin so as to prevent the pin from coming out of the aligned tubes.

* * * * *